Aug. 30, 1938.　　　　F. J. VAUGHN　　　　2,128,625
LATHE TYPE MILLING MACHINE
Filed July 28, 1936　　　7 Sheets-Sheet 2

Aug. 30, 1938.   F. J. VAUGHN   2,128,625
LATHE TYPE MILLING MACHINE
Filed July 28, 1936   7 Sheets-Sheet 4

Inventor
F. J. Vaughn
By Watson E. Coleman
Attorney

Aug. 30, 1938.                F. J. VAUGHN                2,128,625
                      LATHE TYPE MILLING MACHINE
                        Filed July 28, 1936         7 Sheets-Sheet 5

Inventor
F. J. Vaughn
By Watson E. Coleman
       Attorney

Patented Aug. 30, 1938

2,128,625

UNITED STATES PATENT OFFICE 2,128,625

LATHE TYPE MILLING MACHINE

Frank J. Vaughn, Erie, Pa., assignor of one-fourth to James R. Vaughn, Erie, Pa.

Application July 28, 1936, Serial No. 93,087

26 Claims. (Cl. 90—15)

This invention relates to milling machines and particularly to means for milling any slab forged crank shaft such as are used for Diesel engines and the like heavy duty engines weighing from five to ten tons and having a journal diameter from five to ten inches, regardless of the diameter of the crank pin or pins or the weight of the crank.

The general object of this invention is to provide a machine of this character in which the rough slab forging may be operated on to perform any one of the following steps; i. e., roughing, which includes, first, rounding up the journals of the shaft; second, rounding up the crank pin after the crank shaft has been twisted, and third, spacing the cranks: finishing, which includes, first, finishing the spacing and, second, finishing the crank pins.

Another object is to provide means for supporting and rotating the crank shaft at a relatively low speed (a complete rotation occurring once in thirty minutes) which means for rotating the crank shaft is adjustable longitudinally of the crank shaft, the means for rotating the crank shaft engaging with the journals of the crank.

A further object is to provide a cutting head for supporting the cutter, which cutting head is adjustable longitudinally of the crank shaft and which has means whereby it may be fed gradually inward against the part being cut.

A still further object is to provide a milling machine of this character which includes adjustable chucks for supporting the extremities of the crank shaft, these chucks being mounted for rotation around an axis coincident with the axis of the crank pin which is being roughed down or finished.

Still another object is to provide means for rotating the crank shaft in a direction reverse to that of the cutter which includes two power operated eccentrically supported bearings engageable with the journals of the crank shaft on each side of the cutter, these bearings being adjustable to suit any required throw of the crank shaft.

A still further object is to provide means whereby the chuck supporting heads or tailstocks may be shifted longitudinally toward or from each other either manually or by power and whereby the supporting frames or heads for the eccentric bearings may be manually adjustable along the bed of the machine either manually or by power.

A still further object is to provide means whereby the cutter with its motor may be adjusted either manually or by power along its bed and driven in any adjusted position, and means whereby the head with the cutter may be automatically fed towards the work or traversed rapidly away from the work.

Other objects will appear in the course of the following description.

My invention is illustrated in the accompanying drawings wherein—

Figure 1:
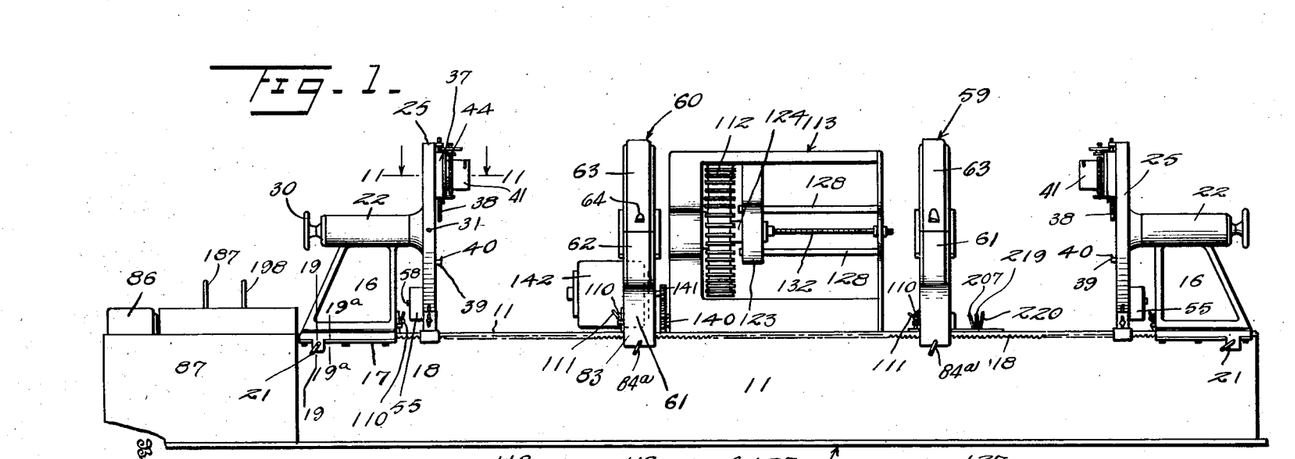
Figure 1 is a front elevation of my crank milling machine.
Figures 3, 3A:
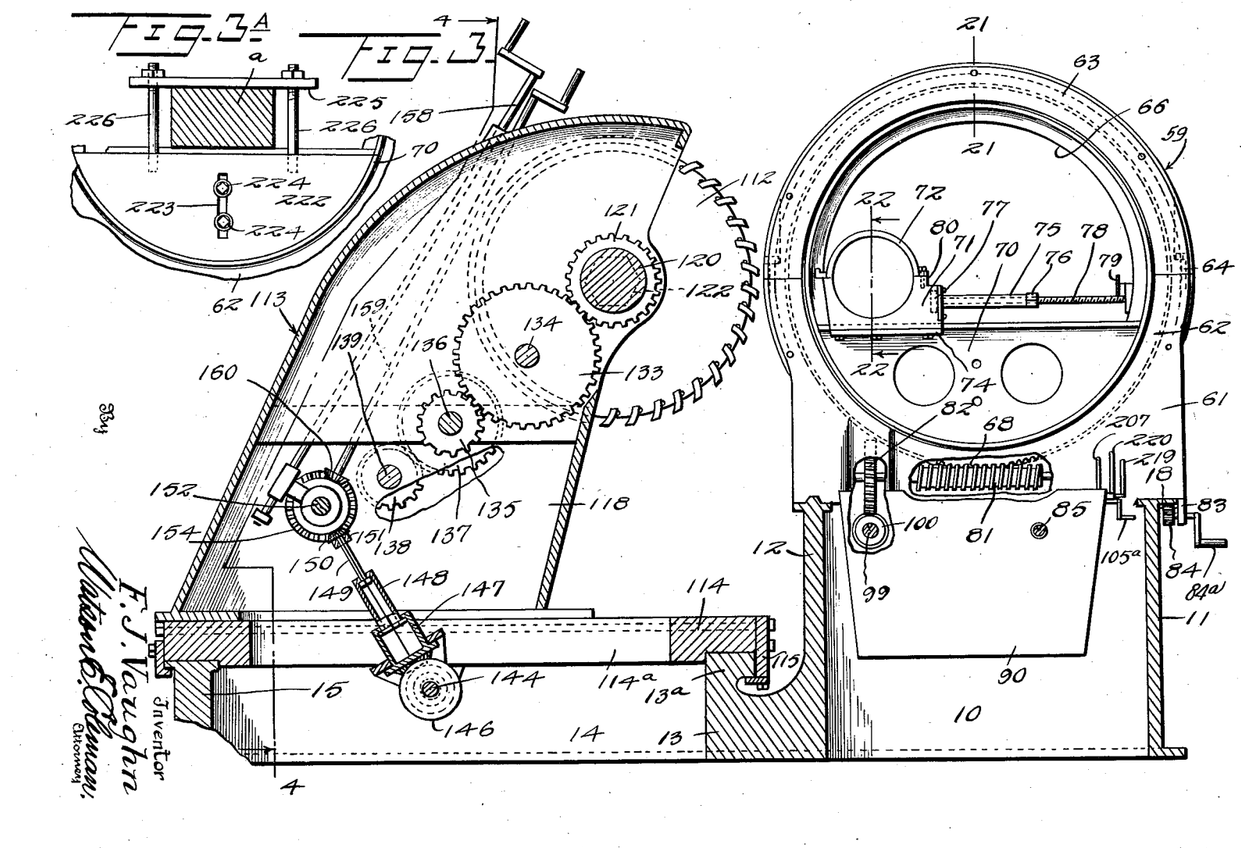
Figure 3 is a section on the line 3—3 of Figure 4.
Figure 3a is an elevation of an attachment for holding the rough crank shaft forging or slab upon the eccentric ring.

Referring to these drawings and particularly to Figures 1 and 3, it will be seen that this machine, generally speaking, includes two connected bed plates providing longitudinally extending parallel pairs of rails, the forward bed plate supporting a pair of tailstocks with corresponding chucks for engaging the extremities of a crank shaft, these tailstocks being adjustable along the corresponding bed plate, a pair of eccentrically adjustable bearings for the journals of the crank shaft likewise adjustable along the corresponding bed plate and on the rear bed a milling cutter mounted for longitudinal movement on the bed plate and for transverse feed relative to the crank shaft being operated on. As shown in Figure 3, the bed 10 for the tailstocks and for the eccentric bearings includes two vertically extending beams constituting rails and designated 11 and 12. The rail 12 extends up from a portion 13 of the bed which forms one track 13a for the support of the milling cutter, the other track being designated 15 and extending upward from the rearmost portion of the bed 14. While I have illustrated the bed 10 and the bed 14 as being cast or otherwise formed in one piece, it is to be understood that these two beds might be separately formed and bolted or otherwise connected to each other.

Figures 2, 7A, 19, 19A, 20:
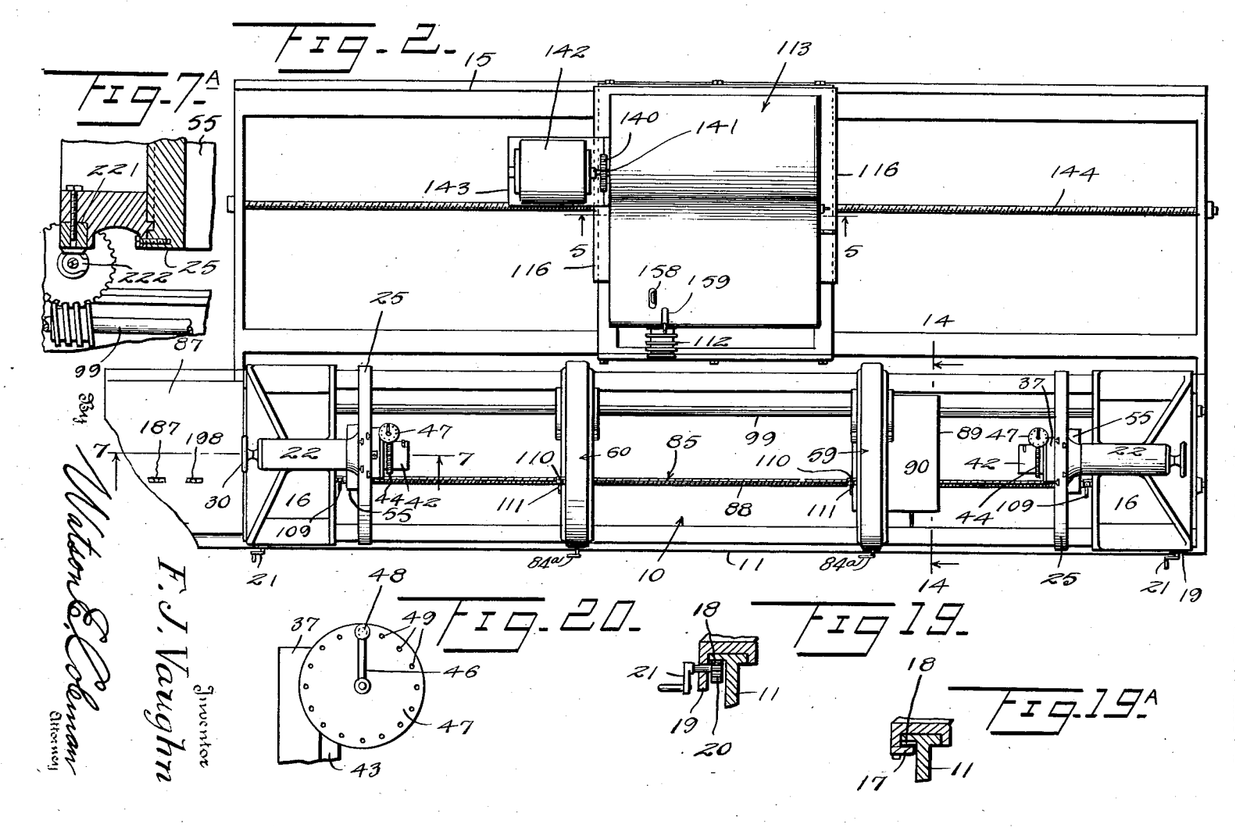
Figure 2 is a top plan view of the construction shown in Figure 1.
Figure 7a is a fragmentary detail section through the chuck supporting disk showing the means whereby it may be positively driven.
Figure 19 is a detail section on the line 19—19 of Figure 1.
Figure 19a is a section on the line 19a—19a of Figure 1.
Figure 20 is a face view of the dial for rotatably adjusting the chuck.

As before stated, the portions 11 and 12 constitute tracks upon which are mounted the two tailstocks 16. The track 11 (and track 12, if necessary) is flanged, as shown in Figure 19a, and this flanged portion has attached to it a plate 17 which extends beneath the flange so as to hold the tailstock on the rail and permit it to slide along the rails 11 and 12. As shown in Figure 1, the underface rail 11 is toothed, as at 18, and as shown in Figure 19, a bearing 19 is provided on the tailstock which carries upon it the shaft of a pinion 20 adapted to be engaged by a detachable or fixed crank 21 and by this means the tailstock 16 may be adjusted by hand toward or from the other tailstock.

Figures 7, 8, 9, 10:
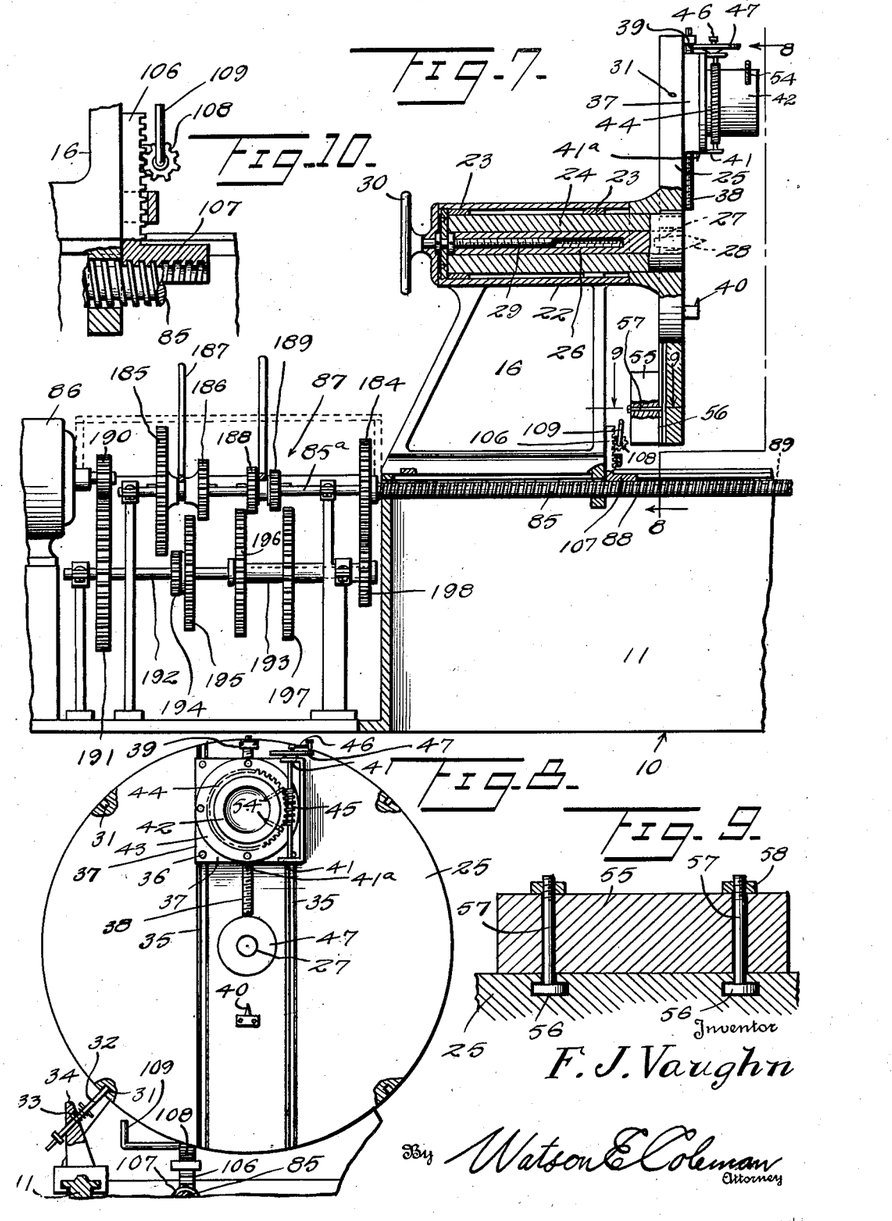
Figure 7 is a fragmentary section on the line 7—7 of Figure 2.
Figure 8 is a section on the line 8—8 of Figure 7.
Figure 9 is a fragmentary horizontal section on the line 9—9 of Figure 7.
Figure 10 is an enlarged sectional detail view of the means for engaging one of the tailstocks with the rapid-traversing screw.

Mounted upon each tailstock, as shown in Figure 7, is a cylindrical housing 22 having bearings 23 for a rotatable spindle 24 which carries keyed upon it the disk or face plate 25. The spindle 24 is annular in cross-section, as shown clearly in Figure 7, and disposed within the central bore of the spindle 24 is an interiorly screw-threaded element 26 whose forward end is formed with a socket 27 shown in dotted lines in Figure 7 in which a centering pin 28 also shown in dotted lines in Figure 7, may be disposed. Swivelled in the outer end of the housing 22 is an adjusting screw 29 which engages the interior screw-threads of the element 26, this adjusting screw being manipulated by means of a hand wheel 30, and as it is rotated in one direction or the other, the centering pin 28 may be projected or retracted. The disk or face plate 25 previously referred to with the member 24, is mounted for rotation in the bearings 23. The periphery of this disk, as shown in Figures 7 and 8, is formed with four or more radial recesses 31, and as shown in Figure 8, a latch designated 32 and supported upon the bed of the machine is adapted to engage in any one of these recesses to hold the disk in any one of a plurality of set positions. These recesses 31 in Figure 8 are shown as being set 90° apart, but I do not wish to be limited to merely four of these recesses. The latch in Figure 8 is shown as being projected by a spring 33 and being carried upon a bracket 34 which may be clamped upon the bed plate, in position to engage any one of the notches.

Figure 11:
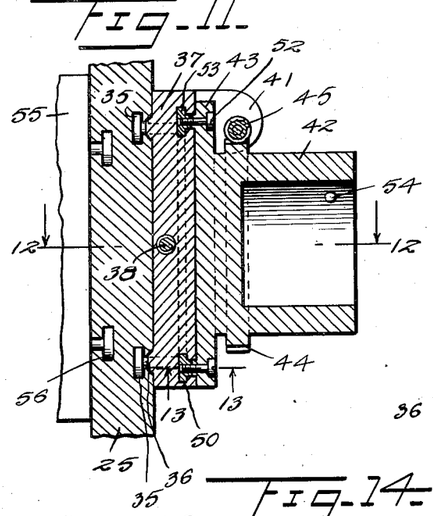
Figure 11 is a fragmentary section through one of the chucks, its support and the supporting plate therefor, on the line 11—11 of Figure 1.
Figure 12:
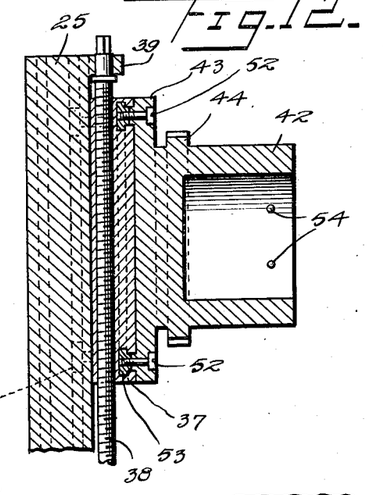
Figure 12 is a section on the line 12—12 of Figure 11.

The outer face of the disk 25, as shown in Figures 11 and 12, is provided with a pair of T-shaped grooves 35 which extend in parallel relation diametrically across the face of the disk 25, as shown in Figure 8, and T-headed bolts 36 passing through a back plate 37 engage in these slots 35. This plate 37 constitutes a carriage which supports the chuck, as will be later described, and the plate 37 may be shifted toward or from the rotative center of the disk 25 by means of a screw 38 which has screw threaded engagement with this back plate 37, as shown in Figure 11, the screw having a hexagonal head whereby a wrench may be applied to thus adjust the carriage or plate 37 diametrically across the face of disk 25. The screw is supported at one end in a bearing 39. The plate or carriage 37 carries a pointer 41a and mounted upon the face of the disk 25 is an element 40 carrying a second pointer. Thus the distance between the fixed pointer 40 and the pointer 41a on the carriage may be measured so as to accurately set the chuck nearer to or further from the center. The plate 37 is formed with two outwardly projecting ears 41 (see Figure 8). On the face of the plate is the chuck proper 42, the rear of the chuck having a flange or base portion 43 shown in Figures 11 and 12. The chuck proper has formed with it the worm wheel 44 engageable by worm 45, the shaft of which is mounted within the ears 41, this worm wheel being provided with a crank 46 operating over a dial 47, as shown in Figure 20, the crank 46 being provided with a pin 48 engageable in any one of a plurality of dial notches 49 on the face of the dial 47 so as to hold the crank in any adjusted position. The pin 48 may be spring projected into any one of these recesses. For the purpose of rotatably supporting the base 43 of the chuck 42, there is formed in the plate 37 an annular T-shaped slot 50 shown most clearly in Figure 13. The base 43 of the chuck proper has on its inside face an annular rib 51 which extends into this annular slot and extending through the face of the flange 43 are a plurality of screws 52 which have screw threaded engagement with a ring 53 disposed within the slot 50. It is obvious that in order to get the ring in place, the member 37 may be made in sections. I have not thought it necessary to show, however, the sectional construction of the member 37 whereby the ring 53 may be put in place. With this construction provision is made for rotating the chuck around its own axis by means of the worm 45. The chuck is provided with set screws 54 shown in Figure 8 whereby the extremity of the crank may be rigidly held within the chuck.

For the purpose of counterbalancing the machine, I mount upon the inner face of the disk 25 a weight 55 which is adjustable toward or from the center of rotation of the disk 25. To this end the rear face of the disk is provided with two parallel T-shaped slots designated 56 in Figure 9 and the weight 55 is held in adjusted engagement with these slots by the bolts 57 provided with T-heads engaging the slots and with nuts 58 engaging against the exterior face of the weight so as to hold it in adjusted position. By this means the machine may be counterbalanced.

It is to be understood that in the operation of this machine, the extremities of the crank to be acted on are supported in these chucks and that the extremities of the crank are rotated around an axis which coincides with the axis of the crank pin which is being milled.

Figure 22:
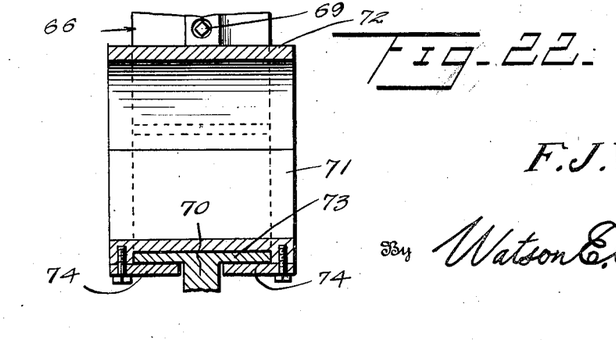
Figure 22 is a section on the line 22—22 of Figure 3.

For the purpose of supporting the crank shaft being treated, at points on each side of the cutter, I provide two bearing elements which carry bearings proper which are eccentric to the center around which the crank shaft is being rotated and which are adapted to engage two journals of the crank shaft. Both these supporting and bearing elements are power driven. The carriages for the power driven eccentric bearings are designated generally 59 and the other is designated 60. The carriage 59 is shown in detail in Figure 3 and comprises a carriage 61 adapted to travel upon the tracks 11 and 12. The upper portion of this carriage is formed to provide a half-ring 62 and coacting with this half-ring is a complementary half-ring 63 which is held in place upon the half ring 62 by means of screws 64 or in any other convenient manner. As is seen from Figure 21, these half-rings 62 and 63 have roller bearings 65 extending through the half-rings or housing sections 63. Disposed within the ring formed by the sections 62 and 63 is a gear wheel designated in Figure 21, 66. The periphery of this gear wheel is formed with an annular recess 67 within which is disposed a gear ring 68 held in place by screws 69, as shown in detail in Figure 21. The lower portion of the ring 62 is formed with a transversely extending web 70 having a flat upper face extending parallel to a line drawn across the diameter of the ring. Mounted upon this flat face as upon a track, is the lower half of a bearing member, this lower half being designated 71. An upper half or semi-circular strap 72 is attached to the lower section 71 so as to define a circle within which the journal of the crankshaft being treated may be mounted. This portion 71 which forms the lower half of the bearing member is movable upon the face of the web 70 longitudinally of this face. It is held upon this laterally flanged track shown in Figure 22 and designated 73, by strips 74 attached to the section 71 and extending beneath the flanges 73. For the purpose of adjusting the bearing 71 toward or from the center of the bearing ring 66, I mount upon the bearing section 71 the interiorly screw-threaded tubular member 75, which is provided with a head 76 whereby it may be rotated and which is swivelled at 77 to the member 71. Fixed to the ring 66 is a fixed screw 78 shown particularly in Figure 3 and as the tubular member 75 is rotated in one direction or the other, it will shift the bearing member 71 toward or from the center of the ring 66. Mounted upon the ring 66 is an index pointer 79 which coacts with a shoulder 80 formed upon the bearing member 71 and by measuring between these points 79 and 80, the proper adjustment for the sliding bearing may be determined. The bearing ring, as before stated, is provided with the teeth 68 and these teeth are engaged by a worm 81 mounted upon the carriage 61, the shaft of this worm carrying a spiral gear 82. This spiral gear is engaged by a second coacting spiral gear mounted, as will be later described, and thus power is applied to rotate the ring 66 and the eccentric bearing around the center of the ring 66. Thus power is applied to the crankshaft to rotate it. Each carriage 59 and 60 is provided on its outside face with a downwardly extending lug 83 and this lug carries a pinion 84, as shown in Figure 3, which in turn engages the rack teeth 18. By this means the carriage 60 or carriage 59 may be manually shifted longitudinally along the bed. The crank supporting and bearing member 60 is of exactly the same construction and may be driven in the same manner as the element 59. These two members 59 and 60 support the crankshaft on each side of and closely adjacent to the milling cutter. This carriage 60 is also adjustable manually along the length of the bed, being provided with a pinion such as the pinion 84 engaging the rack teeth 18. The shaft of these pinions, such as the pinion 84, has its outer end many-sided so as to permit the application of a wrench or crank 84ª to shift the members 59 and 60 by hand.

Before describing the cutting mechanism, I will describe the means whereby power is transmitted to the rings 66 of the carriages 59 and 60 to rotate these rings.

Figures 13, 14:
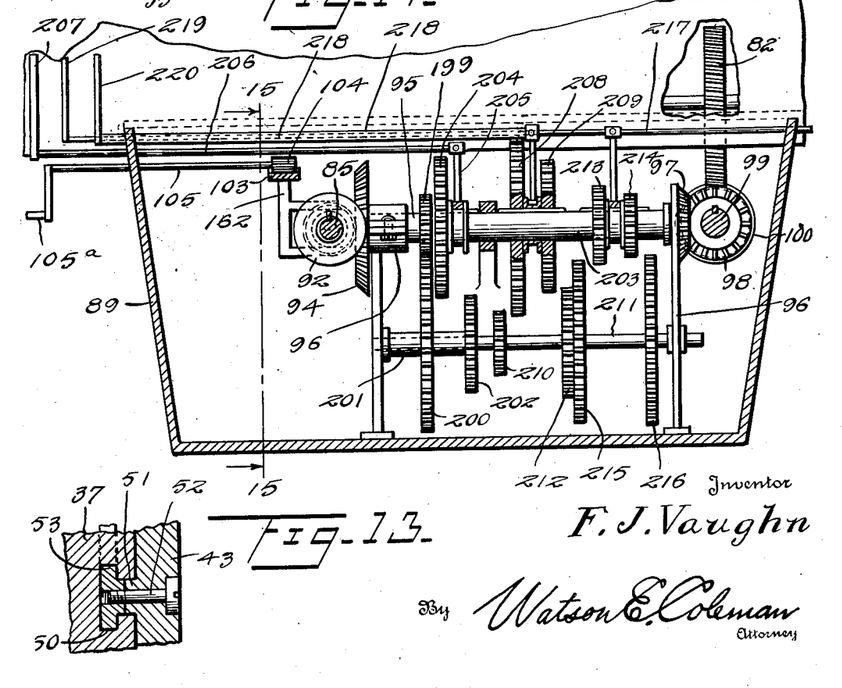
Figure 13 is a fragmentary section on the line 13—13 of Figure 11.
Figure 14 is a transverse section through the speed controlling casing on the line 14—14 of Figure 2.
Figures 15, 16, 21:
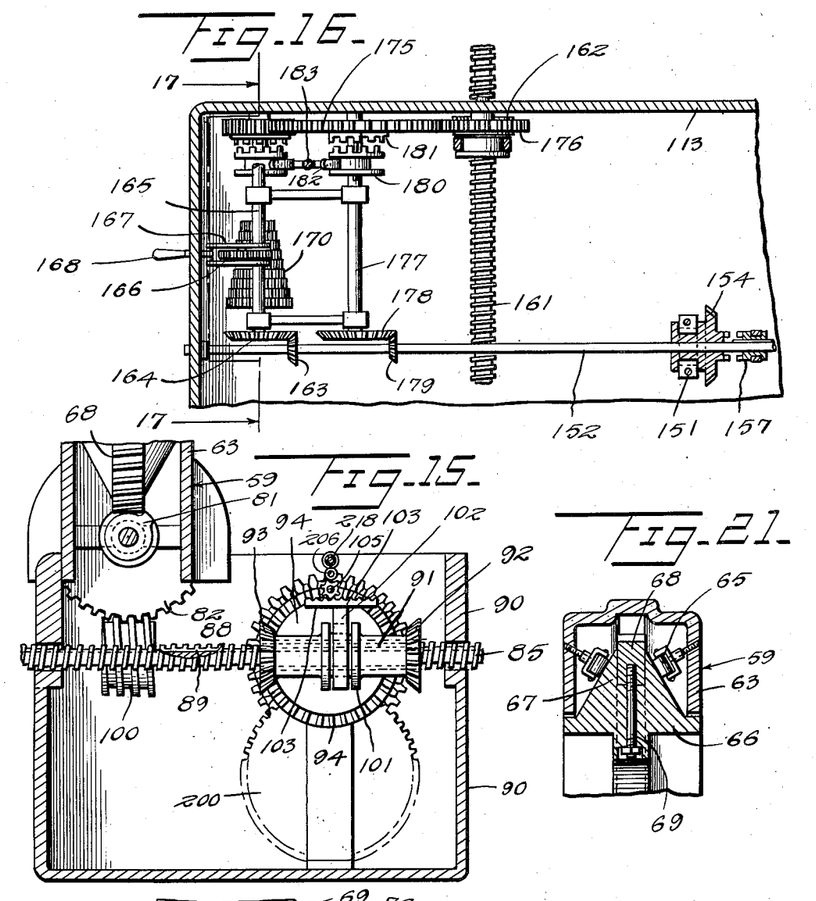
Figure 15 is an elevation of the gearing for driving one of the eccentric crank driving members, the casing being shown in section.
Figure 16 is a section on the line 16—16 of Figure 4.
Figure 21 is a section on the line 21—21 of Figure 3.

By reference to Figure 2, it will be seen that extending longitudinally of the bed 10 is a shaft 85. This shaft is driven from a motor 86 (see Figure 7) through a speed controlling or change speed mechanism designated generally 87. This change speed mechanism is of ordinary and obvious construction and is designed to secure any desired speed for the shaft 85. This shaft 85 is formed with a screw thread 88 which extends practically the entire length of the shaft 85 and which is formed with a longitudinally extending keyway 89. This shaft passes below the carriage of the bearing supporting element 60 and passes loosely through the end walls of a gear enclosing box or casing 90, as shown in Figure 15. Within this gear box and surrounding the shaft 85 is a sleeve 91 shown in Figure 15, carrying upon it two beveled pinions 92 and 93. These beveled pinions coact with a beveled gear wheel 94 mounted upon a transversely extending shaft 95, as shown in Figure 14. The sleeve 91 is shiftable to bring either of the pinions 92 or 93 into engagement with the beveled gear wheel 94 and thus, assuming that the shaft 85 is turning in one direction, motion may be transmitted in either of two directions to the shaft 95, or if the pinions are in a neutral position not engaging the wheel 94, no power will be transmitted to the wheel 94. The shaft 95 is mounted in suitable bearings 96 and through the change speed gears such as shown in Figure 14, power is eventually transmitted to the beveled gear wheel 97 which in turn engages a beveled gear wheel 98 on a shaft 99. This shaft 99 extends parallel to the shaft 85 and carries upon it the spiral gears 100 splined on shaft 99 to slidably move thereon and each spiral gear engages with the teeth of the corresponding spiral gear 82 which drives the worm 81, which in turn rotates the gearing 66 of each bearing element 59. The sleeve 91 which carries the reversing beveled gear wheels 92 and 93 is splined on the screw threads of the shaft 85 and is shiftable to bring either the pinion 92 or the pinion 93 into engagement with the teeth of the gear wheel 94. For the purpose of shifting this sleeve 91, I provide the sleeve with collars 101, as shown in Figure 15, and may provide any usual means for shifting the sleeve 91 which shall engage between these collars. I have illustrated for this purpose, however, a member 102 which engages between the collars and which has a rack 103, this rack being in turn engaged by a pinion 104 shown in Figure 14, supported on a shaft 105 and provided with a lever 105a whereby the gear shifting pinion 104 may be turned in one direction or the other to cause the shifting of the gears.

For the purpose of shifting the tailstocks 16 toward or from each other, I mount for vertical sliding movement upon the inner face of each tailstock a rack 106, as shown in Figures 7 and 10. This rack may be mounted for sliding movement in any suitable manner and carries at its lower end a half-nut 107, and when this half-nut is depressed, its teeth will engage with the screw threads on the shaft 85. This shaft 85 is being constantly rotated and may be reversed in its rotation by reversing the motor which drives this shaft. When it is desired to shift either one of the tailstocks rapidly toward or from the middle of the bed plate to thus change the distance between the tailstocks, the hand operated pinion 108 operatively supported upon the corresponding tailstock is rotated by the handle 109 and this causes the depression of the half-nut 107 into engagement with the threads on the shaft 85 and thus as this shaft is rotated in one direction or the other, the tailstock will be shifted longitudinally of the bed. When one tailstock has been adjusted the half-nut 107 is raised, then the half-nut on the other tailstock is depressed and this tailstock adjusted toward or from the other tailstock, then the corresponding half-nut is raised again and then the fine adjustments may be made by means of the pinion 20 and handle 21 shown in Figure 19, to thus secure a fine adjustment of the tailstocks to the exact position desired.

The carriages which support the eccentric bearing rings previously described and designated 59 and 60 are provided with a pinion 110 which engages a rack and half-nut exactly like the structure shown in Figure 10 for the tailstock. The shaft of this pinion 110 is provided with a handle 111 so that by this means the carriages 59 and 60 may be shifted with relation to each other and longitudinally upon the bed. For the purpose of shifting these carriages 59 and 60 by power and rapidly along the bed to secure the proper adjustment between the carriages, I may provide the same means as is illustrated in Figure 10 for the tailstocks, in other words, provide a half nut engaging the screw threaded shaft 85 and shiftable by a rack and pinion either into engagement with the screw threaded shaft or out of engagement with the screw threaded shaft. In this case, of course, one of these carriages 60 would be shifted first in the direction desired, then it would be released from its engagement with the screw threaded shaft 85 and the split nut of the other carriage would be engaged with the screw threaded shaft, the motor of the screw threaded shaft running directly in one direction or being reversed.

Figures 4, 4A:
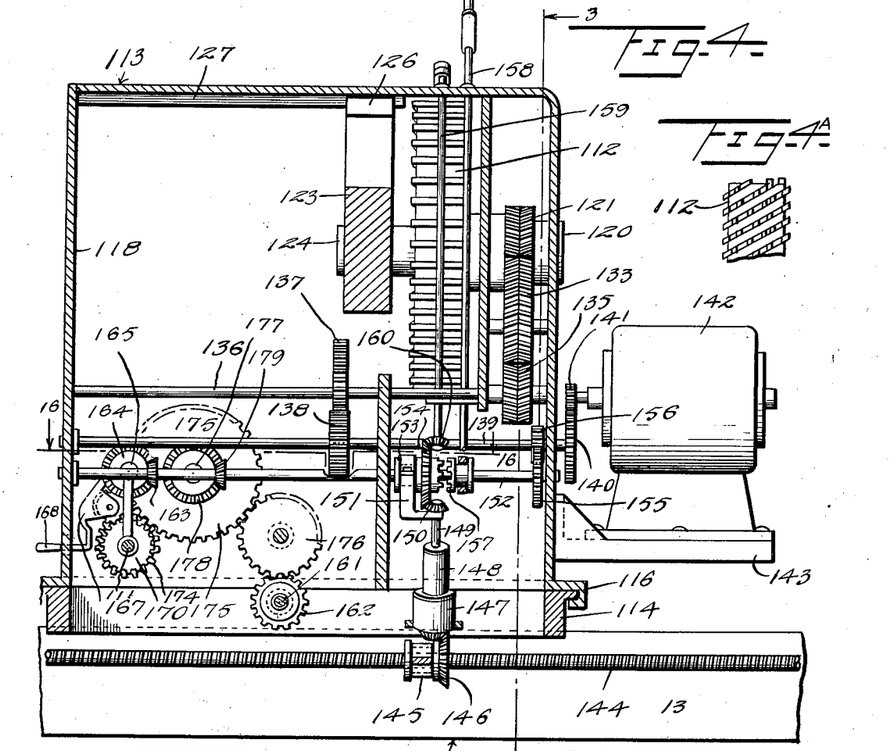
Figure 4 is a section on the line 4—4 of Figure 3.
Figure 4a is a fragmentary elevation of a portion of the cutter showing the proper arrangement of teeth therefor.
Figure 5:
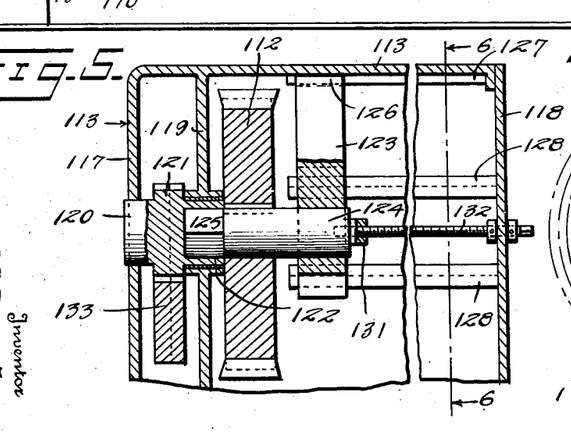
Figure 5 is an enlarged fragmentary section through the cutter housing and cutter.
Figure 6:
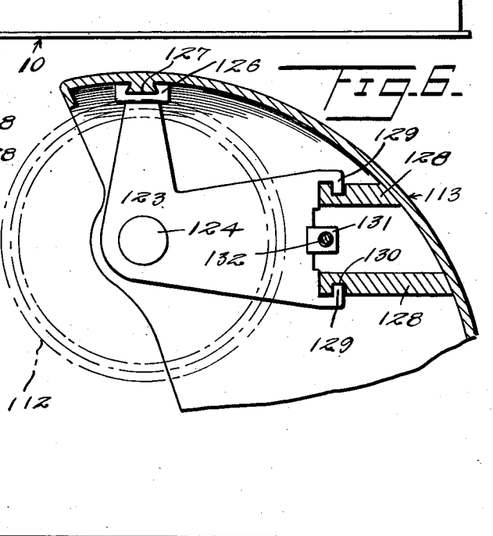
Figure 6 is a fragmentary section on the line 6—6 of Figure 5.

Operating upon the crank shaft which is supported by the means heretofore described and rotated by the rotating bearing supporting members or rings 62, is a cutter designated generally 112. This is a cutter having inserted blades and the cutter is designed to rotate in a clockwise direction in Figure 3. The cutter, generally speaking, is mounted in a housing designated generally 113, which constitutes a support for the cutter shaft and for the driving mechanism thereof and which is mounted for transverse traverse upon a carriage 114 in turn mounted for movement longitudinally of the bed 14 upon the tracks 13a and 15, as shown in Figure 3. The carriage is provided with downwardly extending flanged members 115 which engage beneath overhanging flanges on the track in a manner which is obvious from Figure 3. The carriage is cut away, as at 114a, and the upper face of the carriage is provided with laterally projecting flanges, as shown in Figure 4, while the side walls of the housing have downwardly extending flanges 116, which embrace the laterally extending flanges on the carriage 114. As shown in Figure 5, the housing 113 has an end wall 117 and a removable end wall 118. Mounted in bearings in the wall 117 and in an interior wall 119 is a short shaft 120 carrying a pinion 121, the other end of this shaft, that end which is inserted through the wall 119, being formed with a many-sided socket 122. Slidably mounted within the housing 113 is a bearing bracket designated generally 123, which carries a shaft 124, one end of this shaft being manysided, as at 125. The bearing bracket shown in Figure 6 has an upwardly extending arm and a rearwardly extending arm. The upwardly extending arm is formed with a grooved head 126 which engages with a complemental rib 127 extending inward from the top of the housing 113, the rib and groove being preferably dove-tail in cross-section. The horizontally or rearwardly extending arm of the bracket, as shown in Figure 6, has sliding engagement with tracks 128, the end of the arm being formed with flanges 129 which engage in grooves 130 formed in these tracks. The end of the horizontally extending arm is provided with a screw threaded lug 131 and a screw 132 extends through this lug and is swivelled to the wall 118, the exterior end of the screw being provided with a many-sided head whereby a wrench may be applied to it.

The purpose of the construction shown in Figures 5 and 6 is to support the shaft 124 of the cutter 112 so that the cutter may be removed from the housing for sharpening the teeth thereof for replacement. This is accomplished by turning the screw 132 which shifts the bracket 123 away from the cutter and then the cutter shaft 124 may be withdrawn from the socket 122 and the cutter may be disengaged from its shaft to which it is keyed.

As before stated, the housing 113 is slidable transversely of the bed 14 so as to feed the cutter toward the work. This movement requires a particular arrangement of gearing for driving the cutter, which arrangement is shown particularly in Figure 3. The pinion 121 is driven by a gear wheel 133 mounted on a shaft 134 (see Fig. 3) and in turn driven by a pinion 135 carried on a shaft 136 upon which is a gear wheel 137 driven from a pinion 138 carried by a shaft 139, this shaft 139 carrying upon it a gear wheel 140 (see Figure 4) which is engaged by a pinion 141 on the shaft of the electric motor 142. This motor is mounted to move with the housing longitudinally and transversely of the bed plate and is shown as being mounted upon a bracket 143 carried by the side wall of the housing. Preferably the gears 121, 133 and 135 are herring-bone gears as illustrated in Figure 4. For the purpose of applying power to shift the carriage longitudinally upon the bed, I provide, as shown in Figure 4, a fixed screw threaded shaft 144 which carries upon it a nut 145 carrying a beveled gear wheel 146, as shown in Figures 3 and 4. This beveled gear engages a pinion on a hollow shaft section 147 into which telescopes a second hollow shaft section 148 and into the shaft section 148 telescopes a shaft section 149 carrying at its end a beveled pinion 150. The upper end of this shaft section 149 is supported by a yoke 151 on a shaft 152, which the yoke loosely embraces. The yoke is supported between the collars 153 which are fixed to the shaft 152. Mounted upon the shaft 152 is a beveled gear wheel 154 which engages the beveled pinion 150 so that upon a rotation of the shaft 152, rotation will be given to the several shaft sections which are splined to each other for common rotation. The shaft 152 is driven from the shaft 139 by means of a gear wheel 155 in turn meshing with a pinion 156 on shaft 139. The beveled gear 154 is loose upon the shaft 152 but may be clutched thereto by the clutch 157 operated by a clutch actuating shaft 158 as seen in Figures 3 and 4. Thus when the clutch 157 is thrown in into engagement with the clutch teeth on the gear wheel 154, the gear 154 will rotate with the shaft 152, driving the several telescopic shafts 147, 148 and 149 and rotating the interiorly screw threaded nut 145 upon the fixed screw 144, thus causing the traverse of the carriage or saddle 114 longitudinally of the bed. Thus the carriage may be quickly adjusted by power to any desired point along the bed. When it reaches this point, the clutch 157 is released. The carriage may be manually set to secure a fine adjustment, if desired, by means of the shaft 159 which at its lower end carries a beveled pinion 160 which engages the beveled gear wheel 154. Both of the shafts 158 and 159 are provided with cranks whereby they may be readily rotated. Thus a fine adjustment of the carriage or saddle 114 is secured.

Figures 17, 18:
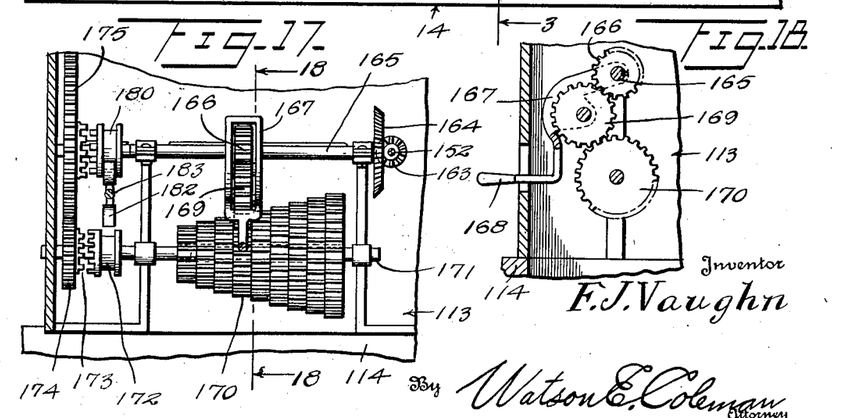
Figure 17 is a section on the line 17—17 of Figure 16.
Figure 18 is a section on the line 18—18 of Figure 17.

For the purpose of securing the feed of the housing 113 and, therefore, the feed of the cutter 112 toward the crank shaft, I provide the mechanism shown in Figures 4, 16, 17 and 18. As shown in Figures 4 and 16, a screw threaded shaft 161 extends longitudinally of the saddle or carriage 114. This screw 161 is fixed and does not rotate. Mounted upon the carriage or saddle 114 is an internally threaded gear wheel 162, the internal threads of which engage this fixed screw 161. It will be obvious that if the gear wheel 162 is rotated in one direction or the other, that the carriage or saddle will be fed either toward the work or away from the work. For the purpose of feeding the carriage at any desired speed toward the work, I mount upon the shaft 152 the beveled pinion 163, as shown in Figure 16, which drives a beveled gear wheel 164 carried by a shaft 165. This shaft has splined upon it the pinion 166. This pinion is movable longitudinally of the shaft 165 by a shifter handle and yoke, the yoke being designated 167 and the handle 168. This pinion 166 engages with an idler 169 carried by the yoke 167 and this pinion, when the yoke is pushed inward, meshes with any one of the stepped toothed faces of a cone gear 170. By adjusting the yoke 167 along the shaft 165, the idler 169 may be brought into engagement with any one of the stepped gear teeth forming the cone gear 170 and thus the shaft 171 carrying the cone gear may be driven at any desired speed relative to the shaft 165. This shaft 171, as shown in Figure 17, carries splined upon it a clutch 172 which engages the clutch teeth 173 on a gear wheel or pinion 174 which in turn engages with a relatively large intermediate gear wheel 175. This gear wheel 175 engages an idler gear wheel 176 which in turn engages the gear wheel 162. Thus when it is desired to feed the cutter toward the work, the yoke 167 is shifted to secure the desired speed, then the idler 169 is lowered or brought into engagement with the desired cone gear and the internal nut 162 is rotated in a direction to feed the cutter toward the work at the speed selected.

For the purpose of retracting the cutter from the work rapidly, I provide a shaft 177 upon which the gear wheel 175 is loosely mounted. This shaft 177 carries upon it a beveled gear wheel 178 which is driven by a beveled pinion 179 from the shaft 152 as shown in Figure 16. Splined upon the shaft 177 is a clutch 180 which is engageable with clutch teeth 181 on the gear wheel 175. If the clutch 172 be thrown out and the clutch 180 thrown in, the gear wheel 175 will be rotated in a reverse direction to its direction of movement upon feeding the carriage or saddle toward the work and the nut 162 will be rotated in a reverse direction upon the fixed screw 161, causing a rapid traverse of the carriage rearward from the work. In order to prevent both of the clutches 172 and 180 being thrown in at the same time and provide actuating means for these clutches, I engage in the annular grooves of these clutches a lever 182. Mounted upon a shaft 183 shown in section in Figures 16 and 17, this shaft extends to the exterior of the housing 113 and provided with a handle (not shown) whereby the clutches may be shifted to carry one clutch inward or into clutching engagement while the other clutch is simultaneously thrown out and vice versa.

It will be seen that by a mechanism which I have described, the cutter may be driven and fed toward the work or may be rapidly retracted and that it may be shifted by the power of the motor 142 longitudinally of the bed 13 into any desired position either by hand or by power. It will likewise be seen that as the cutter is fed toward the right in Figure 3 and toward the work, the shaft sections 147, 148 and 149 will telescope within each other, these shaft sections being shown as many-sided in cross-section so as to secure a sliding engagement with each other and at the same time a rotative engagement with each other.

It will be understood that the change speed mechanism shown in Figure 7 for the purpose of driving the screw 85 may be of any suitable character and I have illustrated a conventional change speed mechanism for this purpose wherein the screw shaft 85 carries at one end the gear wheels 184, which is loose upon the end 85$^a$ of the screw shaft 85. Splined upon this shaft 85$^a$ is a relatively large gear wheel 185 and the companion small gear wheel 186. These are connected to each other and shiftable longitudinally on the shaft section 85$^a$ by means of the shipper lever 187. Also splined upon the shaft end 85$^a$ are the two relatively small pinions 188 and 189. The shaft of the motor 86 carries upon it the pinion 190 which drives a relatively large gear wheel 191 mounted upon a shaft 192. This shaft 192 is mounted in suitable bearings and is illustrated as being at one end inserted within a tubular shaft 193. Mounted upon the shaft 192 is the pinion 194 and the relatively large gear wheel 195 with which the gear wheels 185 and 186 may respectively mesh. Mounted upon the tubular shaft section 193 are the two gear wheels 196 and 197 with which the pinions 188 and 189 respectively mesh, these pinions being connected to each other and for unitary movement being shifted by means of the lever 198. The drive is from the pinion 190, the gear wheel 191 and thence to either of the gear wheels 185, 186, thence from either of the pinions 188 or 189 to either of the gear wheels 196 or 197, thence to a pinion 198 on shaft section 193 and thence to the gear wheel 184. It will thus be seen that the screw 85 may be driven at any desired rate of speed and that it may be driven in either direction at any selected speed by reversing the motor 86. Of course, when the gear wheels 185 and 186 and pinions 188 and 189 are disposed in the neutral position, as shown in Figure 7, the screw 85 is stationary.

In Figure 14, I have illustrated the change speed mechanism for driving the shaft 99 from the screw of the shaft 85. The beveled pinions 93 shown in Figure 15 engage one or the other with the beveled gear wheel 94 mounted, as before stated, upon the stub shaft 95. This shaft carries upon it the pinion 199 which engages with a gear wheel 200 mounted upon a shaft section 201, this shaft section also carrying the gear wheel 202. Splined upon a shaft section 203, as shown in Figure 14, which is alined with the stub shaft 95 is a slidable gear wheel 204 which is movable by a shipper arm 205 into or out of engagement with the gear wheel 202. This shipper arm 205 is connected to a longitudinally movable rod 206 in turn connected to an operating handle 207. Also splined upon the shaft section 203 are two gear wheels 208 and 209. When these gear wheels are shifted toward the left in Figure 14, the gear wheel 208 will engage with the pinion 210 mounted upon a shaft section 211 which is in alinement with the shaft section 201. Also mounted upon this shaft section 211 is a gear wheel 212 which is engageable with the gear wheel 209 when the latter is shifted to the right in Figure 14. Splined to the shaft section 203 are the two differently diametered gear wheels 213 and 214, the gear wheel 213 being shiftable into engagement with a gear wheel 215 mounted on the shaft section 211, while the pinion or gear wheel 214 is shiftable into engagement with a gear wheel 216. Thus the shaft section 203 which carries the gear wheel 97 may be driven at any one of a number of speeds or may remain idle when the shiftable gear wheels are in a neutral position, as in Figure 14. The twin gear wheels 208—209 are shiftable along the shaft 203 by means of the shipper rod 217 which passes through a tubular shipper rod 218, these shipper rods being provided with handles 219 and 220, respectively. Any other means may be used for shifting these gear wheels. Preferably all of the shipper levers 207—219—220—106 are exposed upon the face of the machine, as shown in Figure 1. Thus the crank carried by the rotatable bearings may be driven at any one of a plurality of speeds depending upon the work to be done.

It is to be understood that wherever necessary, ball bearings or roller bearings may be used for the various shafts or rotatable parts. I have not attempted to illustrate either ball or roller bearings, except the roller bearings 65 for the inclined lateral faces of the ring 66 in Figure 21. These roller bearings are of standard type and are adjustable in and out to compensate for wear or take up any looseness in the parts.

Where relatively short cranks are being milled down, it will only be necessary to rotate the crank by means of the eccentric drives or bearings, but for extremely long and heavy cranks, it will be necessary to positively drive not only both eccentrics 59 and 60, but to drive the disks 25 carrying the chucks. These disks or face plates may be driven in the same manner as the eccentrics as shown in Figure 7a wherein 221 indicates a worm wheel which may be detachably engaged with the disk 25, the teeth of which mesh with a worm 222. This worm is driven in exactly the same manner as the worm 81 and, therefore, the manner of driving the worm is not illustrated. Under these circumstances where the worm 221 is attached to the rear face of the disk 25, the counterweight 55 will be disposed upon the front face of the disk. In view of the fact that the drive for these face plates, if used, is of exactly the same character as the drive for the eccentric bearings, I have not thought it necessary to illustrate this modification in detail.

As will be explained later, the rough forging, when first acted on by this machine, is approximately rectangular in cross section, particularly as regards the webs in which the wrist pin and crank arms are formed, and it is necessary, when this rough forging is first operated on by this machine, that means be provided for clamping the forging in place upon the eccentric carriages 59 and 60. To this end, I remove from the web 70, Figure 3, the bearing 71 and the telescopic screws 75 and 78, and dispose against the web 74 the approximately semi-circular plate 222, as shown in Figure 3a. This place is radially slotted, as at 223, and bolts 224 pass through this slot and into the segmental web 74, there being holes drilled in this web for this purpose. The upper face of the plate 222 is designed to be flush with the segmental web 70 and the web a of the rough crankshaft is laid flat against the upper edge of the plate 222 and held there by a clamping bar 225 and by bolts 226 passing through the clamping bar. By this means, the rough crankshaft may be rotated around the axis of the crankshaft or in other words, around the centers 28 carried by the tailstocks, the disk 25 being stationary at this time.

In the operation of forming a crankshaft such as used by the Navy for heavy duty, or other heavy crankshafts of this general character, the crankshaft is first roughly forged to shape with the middle portion of the shaft in the form of a blank or slab with two extensions or arms extending from the ends of the slab, which will later form the end journals of the shaft. A number of saw cuts are then made into the slab and the pieces defined by the saw cuts are then broken out, leaving the slab with alternate webs and recesses extending in from one edge. The arms or end journals of the shaft will also be formed with central bores to receive the centering pins 28, as shown in Figure 7. Then the end journals or arms are milled by the milling machine, the crankshaft rotating upon the centering pins 28 and being rotated by the structure shown in Figure 3a. The intermediate journals between the webs are also at this time turned down and then the crankshaft is twisted so as to cause the webs to be disposed at angles with relation to each other. The webs are then sawed inward toward the outer ends of the webs and the parts defined by the saw cuts are broken out leaving the webs with the general form of the crank arms and wrist pins. The extremities of the crankshaft or the end journal bearings are then turned to a given size to fit within the chucks 42 or within bushings disposed in said chucks. This is done on an engine lathe. The crankshaft is then placed in my machine, it being understood that the intermediate journals have been milled in the previous operation sufficiently accurately for rough milling the crank pins. In placing the crank in the machine, the arms or end journals are disposed within the chucks while two of the intermediate journals are engaged with the eccentric bearing 72 of the carriages 59 and 60. The crankshaft is then rotated around an axis coincident with the axes of the pins being milled and the crank pins are rounded up one-half inch above finish and the inside "spacing" and outside "spacing" of the cranks is completed by the milling machine. This completes the "roughing" operation. In order to finish the crankshaft, the crank is carried to the finishing department, and the first operation is to turn precisely to a given size all of the journals of the crankshaft, including the end journals. The crank is then placed in my machine with the centering pins 28 engaging the centers in the ends of the shaft. The disks 25 and the chucks 42 are not used in this operation and the bearing member 71 of the eccentrics is moved to the centers of the rings 66 and engages the journals of the crankshaft. These bearings act as steady rests. These bearings are clamped down tightly enough to cause the rotation of the crank shaft as the rings of the carriages 59 and 60 are rotated. With this set up, the outside spacing is finished.

After the spacing operation has been performed, the crank is then taken out of the machine and the chucks and eccentric bearings of the carriages 59 and 60 are adjusted to the required stroke of the crank. The crank is again placed in the machine, this time with the chucks engaging the end journals of the crankshaft while the eccentric bearings engage the intermediate journals on each side of the pin which is to be turned down. The eccentrics are then rotated and the crank pins are finished. Later on, the journals are completely finished to dimensions on an engine lathe and grinder.

After milling one crank pin, another crank pin may be milled by locking the face plate 25 by the latches 32. The caps 72 of bearing 71 are removed and the rings 66 rotated until the edges of web 70 are vertical, then the carriers 59 and 60 can be shifted longitudinally to new positions on each side of the crank next to be formed. The crankshaft is rotated to bring the pin to be milled into operating relation to the milling cutter, that is, into position in line with the center of rotation of the face plates 25. Then the rings 66 are reversely rotated to bring them to their original position where the bearings will engage the new crank pin accurately without any readjustment. This is secured by making the open space above web 70 greater than one-half the diameter of the ring 66. This permits the eccentric ring to be turned without changing the adjustment of the bearing on the eccentric, which adjustment is equal to the throw of the cranks. This capability is due to the fact that the cap 72 is removable and to the open space above the web. With other known structures, the crankshaft must be taken out entirely in order to move the eccentric rests or bearings to different positions along a multiple throw crankshaft.

I have referred above to the fact that after one crank pin has been milled, it is necessary to rotate the crankshaft to bring the next pin to be milled into operative relation to the milling cutter. To this end, I provide the chuck indexing means shown in Figs. 8 and 20, which secures absolute accuracy in rotating the crankshaft operated on to bring a new crank into position for milling. Each crank pin must have a definite angle with relation to other crank pins. Each time that a new pin is to be operated on by the milling cutter, the crankshaft must be rotated on the axes of the chucks 42 to bring the new pin to a position exactly coincident with the rotative axis of the face plates 31. This is done by turning the cranks 46 on both face plates a predetermined number of complete revolutions and/or fractions thereof. These fractions of a complete rotation cannot be merely guessed at, hence the indexing plate has apertures 49 which will secure the crank handle accurately at any desired fraction of a complete rotation. I am aware that a dividing or indexing head for the purpose of equally dividing the circle into a given number of spaces or angles is old, but by applying an indexing means to a chuck for use on crankshaft milling machinery, I secure absolutely accurate means for getting the exact angle from one crank pin to another. In actual practice, assuming that the worm 45 is a single thread worm and the worm gear wheel 44 has thirty teeth, then there is a ratio of 30 to 1. If the handle 46 is given 30 turns, it will rotate the chuck one full turn or 360°. 10 turns of the handle will rotate the chuck ⅓ of the turn or 120°, and, of course, 15 turns of the handle will rotate the chuck through 180°. The plurality of perforations 49 in the indexing plate 47, see Fig. 20, are for getting angles that do not come out in an even number of turns of the handle 46 such, for instance, as 40°. This would require 3⅓ turns of the handle 46. This third turn of the handle cannot be guessed at and, therefore, I employ a circular series of perforations 49 in the plate 47, the number of these holes being divisible by 3. Thus, for example, if 18 holes were employed and the handle is turned 3 full turns and then inserted in the 6th hole, the chuck will have been rotated 1/9 of a complete turn or 40°. Thus it will be seen that I have provided means which will secure the crank handle 46 at any desired fraction of a complete rotation. Obviously the number 18 above referred to as the number of the perforations 49 may be increased so as to secure finer graduations if desired, or the number of holes may be decreased. Fig. 20 shows 17 holes 49 in the plate 47, but this is purely illustrative.

The value of the removable centering point 28 lies in the fact that it may be used to indicate that the machine is accurate regardless of wear by placing a rigid bar between the centers 28 on the two tail stocks and fixing the bar by a standard dial indication which will indicate whether or not the gear rings are concentric with the centers of the face plates 45. These centering pins 28 are also used when working on the journal of the crankshaft, but the centering pins must be removable in order to permit the sliding carriage 37 which carries the chuck, to move to a position with its inner edge close to the center of the face plate 25.

While I have illustrated a cutter of a single diameter, yet it is to be understood that the cutter might be in the form of a built-up cutter or "gang mill" cutter to form rounded tops and heels on the crank arms at the same time that the pin is being operated on and the outside spacing is being done.

It is to be understood that a "straddle mill" cutter may also be used for outside spacing, either roughing or finishing. While for convenience of illustration, I have shown the cutter teeth as extending entirely across the body of the cutter and parallel to the plane of its axis, I wish it understood that in practice the teeth will be disposed in rows diagonal to the axis of the cutter and that these teeth will be broken or notched as the shock of a straight wide tooth coming into contact with the work is too great for the machine to withstand. I have shown a detail in Figure 4a, illustrating the manner of actually constructing the teeth in the mill cutter.

While I have illustrated certain details of construction and arrangement of parts, it is to be understood that these might be varied in many respects without departing from the spirit of the invention as defined in the appended claims.

What is claimed is:

1. A crankshaft milling machine, including two parallel beds, tailstocks independently adjustable along one of said beds, each tailstock having a face plate, a chuck rotatably mounted on the face plate for bodily rotation around a central axis, each chuck being independently rotatable around its own individual axis, means for bodily adjusting the chuck toward or from the first named axis, manually operable means for rotatably adjusting each chuck around its own individual axis, crankshaft bearing carriages disposed between said tailstocks and each independently adjustable along the bed which supports the tailstocks, each carriage including a gear ring mounted in the carriage for rotation in a vertical plane, a crankshaft bearing mounted in each ring for movement parallel to the diameter of the gear ring, manually operable means for adjusting the bearing toward or from the rotative center of the gear ring, manually controlled power operated means engaged with one of said rings to rotate it, a rotatable milling cutter mounted upon the other of said beds for longitudinal movement therealong and for movement toward or from the work, and manually controlled power operated means for driving the cutter and feeding it towards the work or retracting it therefrom.

2. A crankshaft milling machine, including two parallel beds, a rotatable milling cutter having peripheral and lateral cutting faces, the cutter being mounted on one of said beds for longitudinal movement therealong and for movement transversely of the bed toward and from the work, manually controlled power operated means for driving the cutter and feeding it toward the work or retracting it therefrom, and power operated means adjustable along the other of said beds into a position adjacent to but on each side of the cutter for rotating the crankshaft and supporting it on each side of the plane of cut and closely adjacent thereto.

3. A crankshaft milling machine, including two parallel beds, a rotatable milling cutter mounted on one bed for longitudinal movement therealong and for movement transversely of the bed toward or from the work, manually controlled power operated means for driving the cutter and feeding it toward the work or retracting it therefrom, a pair of tailstocks mounted upon the other bed for independent longitudinal adjustment therealong, each of said tailstocks having a chuck adapted to engage the extremities of the crankshaft, each chuck being rotatable bodily around a main axis, each chuck being mounted for rotation around its own individual axis, means for adjusting each chuck toward or from the first named axis, means for driving and supporting the crank shaft, including two carriages independently adjustable along said last named bed and between the tailstocks, each carriage including a gear ring mounted for rotation in the carriage, a crankshaft bearing for each gear ring mounted in the ring for movement parallel to the diameter of the gear ring, manually operable means for adjusting the bearing toward or from the center of the gear ring, and manually controlled power operated means engaged with each ring to actuate it.

4. In a mechanism of the character described, a longitudinally extending bed, tailstocks mounted upon the bed, chucks mounted upon the tailstocks for bodily rotation around a central axis, means for shifting the chucks toward or from said central axis, manually operable means for rotatably adjusting each chuck around its own individual axis, carriages mounted upon the bed between the tailstocks and independently adjustable with relation to each other and with relation to the tailstocks longitudinally of the bed, a gear ring rotatably mounted in each carriage, a worm operatively engaging the gear ring of one carriage, a crankshaft bearing mounted upon each carriage for adjustment toward or from the center of the corresponding gear ring, and means for driving said worms, including a longitudinally extending power driven screw threaded shaft, a parallel shaft, means for driving the second named shaft and the first named shaft in either direction, and means associated with one of said carriages for driving the corresponding gear ring from the second named shaft in all positions of the carriage.

5. In a mechanism of the character described, a bed, a carriage mounted upon the bed for movement longitudinally thereof, a ring mounted for rotation in a vertical plane within said carriage, the ring having a track extending parallel to a diametric line drawn through the center of the ring, a crankshaft bearing mounted upon said track, manually operable means mounted upon the ring for adjustably shifting the bearing toward or from the center of the ring, and power operated means for rotating the ring.

6. A crankshaft milling machine, including two parallel beds, tailstocks mounted upon one bed for independent longitudinal movement along the bed, each tailstock carrying a rotative member and a chuck rotatably mounted upon said member and movable bodily toward or from the center of said member, each chuck having means whereby it may be manually rotated, a pair of carriages supported on the bed plate supporting the tailstocks and between the tailstocks and each independently movable along the bed, a ring rotatably mounted in each carriage for rotation in a horizontal plane, a crankshaft supporting bearing carried by each ring and manually adjustable toward or from the center of the ring, the ring on one carriage having gear teeth, a power operated shaft, means operatively gearing the gear ring to said shaft to cause a slow rotation of the gear ring, a cutter supporting carriage mounted upon the other bed for movement therealong, manually controllable means for moving said carriage along the bed and holding it in adjusted position, a housing mounted upon said carriage for movement transversely of the bed, a rotatable cutter mounted within said housing, a motor carried by said housing and movable therewith, a train of gear wheels affording a driving connection between said motor and the shaft in which the cutter is mounted, manually controlled power operated means for feeding the housing in a direction to carry the cutter toward the work at any one of a plurality of speeds, and manually controlled power operated means for retracting the housing to carry the cutter from the work.

7. A crankshaft milling machine, including two parallel beds, tailstocks mounted upon one bed for independent longitudinal movement along the bed, each tailstock carrying a rotative member and a chuck rotatably mounted upon said member and movable bodily toward or from the center of said member, each chuck having means whereby it may be manually rotated, a pair of carriages supported on the bed plate supporting the tailstocks and between the tailstocks and each independently movable along the bed, a ring rotatably mounted in each carriage for rotation in a horizontal plane, a crankshaft supporting bearing carried by each ring and manually adjustable toward or from the center of the ring, the ring on one carriage having gear teeth, a power operated shaft, means operatively gearing the gear ring to said shaft to cause a slow rotation of the gear ring, a cutter supporting carriage mounted upon the other bed for movement therealong, manually controllable means for moving said carriage along the bed and holding it in adjusted position, a housing mounted upon said carriage for movement transversely of the bed, a rotatable cutter mounted within said housing, a motor carried by said housing and movable therewith, a train of gear wheels affording a driving connection between said motor and the shaft in which the cutter is mounted, manually controlled power operated means for feeding the housing in a direction to carry the cutter toward the work at any one of a plurality of speeds, manually controlled power operated means for retracting the housing to carry the cutter from the work, including a fixed screw mounted upon the carriage, an internally threaded nut engaging said screw and having a gear wheel attached thereto, a power operated shaft, a cone gear, a pinion driven from said shaft and shiftable to engage any one of the steps in the cone gear, gearing adapted to drive the gear wheel on the nut from the shaft of the cone gear, including a clutch and means for driving the gear wheel on the nut in a reverse direction and directly from said shaft and including a clutch.

8. In a milling machine of the character described, a bed, a carriage movable longitudinally on the bed, manually controlled means for shifting said carriage, a housing mounted upon the carriage for movement transversely of the bed, the housing having one end wall, the other end of the housing being open, a gear wheel operatively supported within the end wall of the housing and having a socket, a cutter having an arbor insertible into said socket, the socket and arbor being many-sided, the cutter having an oppositely projecting arbor and a bearing member mounted upon the housing and having a socket to receive the last named arbor, the bearing member having arms extending at right angles to each other and having interlocking sliding engagement with the housing so constructed and arranged as to permit the bearing member to be shifted on said housing toward or from the cutter arbor, and a screw operatively engaging said bearing member and housing and rotatable to shift the bearing member in one direction or the other.

9. In a milling machine of the character described, a bed, a carriage mounted upon the bed for longitudinal adjustment therealong, a housing mounted upon the carriage for movement transversely of the bed, a motor mounted upon the housing, a rotatable cutter having a shaft mounted within the housing, a driving shaft extending longitudinally of the bed and carried by the housing, an operative connection between the motor and the driving shaft, driving gearing between the driving shaft and the cutter shaft and including manually controlled change speed gearing, a screw threaded shaft extending longitudinally of the bed, a nut having threaded connection with the last named shaft and having a gear wheel, a shaft extending longitudinally of the housing and having operative connection to the motor, a gear wheel loose on said last named shaft, a shaft formed of telescopic sections at one end having a pinion meshing with the gear wheel on the nut and at the other end having a pinion meshing with the said loose gear wheel, a manually rotatable shaft having a pinion thereon engaging with the loose gear wheel, and a manually shiftable clutch associated with the loose gear wheel and adapted to engage it with the shaft upon which the loose gear wheel is mounted whereby to cause the rotation of the nut either by hand or by power to thus cause the travel of the carriage longitudinally of the bed.

10. A milling machine of the character described, including two parallel beds, tailstocks mounted upon one of said beds for movement toward or from each other, each tailstock having a disk rotatably mounted in the tailstock, a chuck mounted on each disk and manually adjustable toward or from the rotative center of the disk, each chuck being rotatable around its own individual axis, manually operable means for adjustably rotating the chuck for holding it in its rotative position, carriages disposed upon the last named bed and independently movable therealong, the carriages being disposed between the tailstocks, each carriage having a vertically disposed annular bearing and a ring disposed within said bearing, each ring carrying a crank bearing manually adjustable toward or from the center of the ring, one of said rings having gear teeth, a worm engageable with said gear teeth, a gear wheel on the worm shaft, a motor operated screw threaded shaft extending longitudinally of the bed, means for manually adjusting said carriages nearer to or further from each other, means for manually adjusting the tailstocks nearer to or further from each other, manually controlled means for operatively connecting each tailstock and each carriage to the screw threaded shaft for independent movement longitudinally of the bed, a second shaft extending longitudinally of the bed, a gear wheel splined upon the second named shaft and mounted for movement with the carriage having the worm gear and engaging the gear wheel on the worm gear shaft, a gear wheel splined upon the first named shaft and carried by said carriage and movable with the carriage longitudinally of the screw threaded shaft, operative connections between the last named gear wheel and the gear wheel engaging the worm gear wheel and including change speed mechanism whereby the bearing in the carriage may be rotated at a selected speed under power in either direction, a carriage mounted upon the other bed for movement longitudinally thereof, a housing mounted upon the carriage for movement toward or from the first named bed, a motor mounted on the carriage and movable therewith, means operatively connectable with said motor for shifting the carriage longitudinally of the bed, manually operable means for adjusting the carriage longitudinally of the bed, manually controlled motor operated means for feeding the housing at a selected speed toward the first named bed, manually controlled means for rapidly retracting the housing, a rotary cutter mounted in the housing and engageable with the work supported by said tailstocks and bearings, and manually controlled means for rotating said cutter.

11. In a mechanism of the character described, a longitudinally extending bed, tailstocks mounted upon the bed for longitudinal movement thereon, chucks mounted upon the tailstocks for bodily rotation around a central axis, means for adjusting the chucks toward or from said central axis, manually operable means for rotatably adjusting each chuck around its own individual axis, carriages mounted upon the bed between the tailstocks independently adjustable with relation to each other and with relation to the tailstocks longitudinally of the bed, a gear ring rotatably mounted on each carriage, a crank shaft bearing mounted upon each carriage for adjustment toward or from the center of the corresponding gear ring and means for driving said gear rings including a longitudinally extending power driven screw-threaded shaft, means for driving the gear rings from the shaft and means associated with each tailstock and with each carriage manually shiftable into or out of position to afford screw-threaded engagement between the shaft and the correspondng carriage or tailstock whereby each tailstock and each carriage may be independently shifted by power along the bed, and means for driving the screw-threaded shaft in either direction.

12. In a mechanism of the character described, a bed, a carriage mounted upon the bed for movement longitudinally thereof, a gear ring mounted for rotation in a vertical plane within said carriage, the ring having a track extending parallel to a diametric line drawn through the center of the ring, a crankshaft bearing mounted upon said track, manually operable means mounted upon the ring for adjustably shifting the bearing toward or from the center of the ring and power operated means for rotating the ring, and index members mounted upon the crankshaft bearing and upon the ring in alined confronting relation to each other in the direction of movement of the crankshaft bearing whereby to permit the position of the crankshaft bearing to be accurately determined.

13. In a mechanism of the character described, a bed, a carriage mounted upon the bed for movement longitudinally thereof, a gear ring mounted for rotation in a vertical plane within said carriage, the ring having a track extending parallel to a diametric line drawn through the center of the ring, a crankshaft bearing mounted upon said track and including a bearing member engaged with the track for sliding movement and having a semi-circular seat in its upper face and a complementary semi-circular member detachably engaged with the upper face of the bearing member, manually operable means mounted upon the ring for adjustably shifting the bearing toward or from the center of the ring, and power operated means for rotating the ring.

14. In a mechanism of the character described, a bed, a carriage mounted upon the bed for movement longitudinally thereof, a gear ring mounted for rotation in a vertical plane within said carriage, the ring having a track extending parallel to a diametric line drawn through the center of the ring, a crankshaft bearing mounted upon said track and means for shifting said bearing toward or from the center of the ring including a tubular internally threaded member swivelled at one end in the bearing and extending parallel to the track, and an externally screw-threaded member having threaded engagement with the first named member and extending from the ring.

15. In a mechanism of the character described, a bed, a carriage mounted upon the bed for movement longitudinally thereof, a gear ring mounted for rotation in a vertical plane within said carriage, a web disposed within said ring and having one face thereof constituting a track and extending parallel to a diametric line drawn through the center of the ring, power operated means for rotating the ring and means for clamping the flat blank of a rough crankshaft upon said track, comprising a plate adapted to be disposed against the said web, bolts detachably holding the plate upon the web, and crankshaft clamping means carried upon the upper edge of the plate and extending above the track.

16. In a mechanism of the character described, a bed, a carriage mounted upon the bed for movement longitudinally thereof, an annular housing mounted on the carriage, the housing being channel-shaped in cross-section, a gear ring mounted for rotation in a vertical plane within said housing, the side faces of the ring being outwardly convergent, the peripheral face of the ring having gear teeth, anti-friction bearings carried by the housing on each side of the gear ring and bearing against the convergent faces thereof, the ring having a track extending parallel to a diametric line drawn through the center of the ring, a crank shaft bearing mounted on said track, manually operable means mounted upon the ring for adjustably shifting the bearing toward or from the center of the ring, and power operated means for rotating said ring and including a member engaging the teeth of the gear ring.

17. In a mechanism of the character described, a bed, a carriage mounted upon the bed for movement longitudinally thereof, an annular housing mounted on the carriage, the housing being channel-shaped in cross-section, a gear ring mounted for rotation in a vertical plane within said housing, the side faces of the ring being outwardly convergent, the peripheral face of the ring having a circumferentially extending groove, an annular toothed element disposed in said groove, means extending through the gear ring and holding said toothed element in place, anti-friction bearings carried by the housing on each side of the gear ring and bearing against the convergent faces thereof, the ring having a track extending parallel to a diametric line drawn through the center of the ring, a crank shaft bearing mounted on said track, manually operable means mounted upon the ring for adjustably shifting the bearing toward or from the center of the ring, and power operated means for rotating said ring and including a member engaging the teeth of the gear ring.

18. A crankshaft milling machine, including a longitudinally extending bed, a tailstock mounted on said bed and having a chuck rotatably mounted upon the tailstock for bodily rotation around a central axis, each chuck being independently rotatable around its individual axis, means for bodily adjusting the chuck toward or from the axis around which it bodily rotates, manually operable means for rotatably adjusting each chuck around its own individual axis, a pointer mounted upon the tailstock, and a coacting alined pointer mounted upon the chuck whereby the adjustment of the chuck toward or from the central axis may be accurately determined.

19. A crankshaft milling machine, including in its construction a tailstock, a face plate rotatably mounted upon the tailstock and having parallel tracks extending across the face plate parallel to a diametric line, a plate confronting the face plate and operatively engaging said tracks, a screw extending on a diametric line and having threaded engagement with the last named plate whereby the plate may be shifted toward or from the rotative center of the face plate, a cylindrical hollow chuck rotatably mounted upon the second named plate for rotation around its own axis, the chuck having gear teeth, and a worm mounted upon the second named plate and engaging the gear teeth, the worm having means whereby it may be manually rotated to thereby rotatably adjust the chuck.

20. A crankshaft milling machine, including in its construction a tailstock, a face plate rotatably mounted upon the tailstock and having parallel tracks extending across the face plate parallel to a diametric line, a plate confronting the face plate and operatively engaging said tracks, a screw extending on a diametric line and having threaded engagement with the last named plate whereby the plate may be shifted toward or from the rotative center of the face plate, a chuck rotatably mounted upon the second named plate for rotation around its own axis, the chuck having gear teeth, a worm mounted upon the second named plate and engaging the gear teeth, the worm having means whereby it may be manually rotated to thereby rotatably adjust the chuck, a pointer mounted upon the face plate to one side of the center thereof and between said tracks, and a coacting alined pointer mounted upon the second named plate to provide means whereby the adjustment of the second named plate toward or from the center of the face plate may be accurately determined.

21. A crankshaft milling machine, including in its construction a tailstock, a face plate rotatably mounted upon the tailstock, a chuck rotatably mounted upon the face plate for bodily rotation with the face plate around the central axis of the plate, the chuck being independently rotatable around its own individual axis, means for bodily adjusting the chuck toward or from the axis of the face plate, manually operable means for rotatably adjusting the chuck around its own individual axis, the face plate having a plurality of uniformly spaced recesses in one face thereof, and a spring projected bolt fixedly mounted with relation to the rotative face plate and engageable in any one of the recesses to hold the face plate in any one of a plurality of rotatively adjusted positions.

22. A crankshaft milling machine, including in its construction a bed, a tailstock mounted on the bed and having a face plate mounted upon the tailstock for rotation around a central axis, a chuck carried by the face plate for bodily rotation therewith, the chuck being adjustable toward or from the center of the face plate and the chuck being independently rotatable around its own individual axis, the center of the face plate having a recess, and a centering pin detachably disposed within said recess.

23. A crankshaft milling machine, including in its construction a bed, a tailstock mounted on the bed, a face plate having a rearwardly extending annular hub rotatably mounted upon the tailstock, a chuck mounted upon the face plate, means for adjusting the chuck toward or from the center of the face plate, a longitudinally shiftable member disposed within the annular hub of the first plate and carrying a centering pin on its outer end, and manually operable means for projecting or retracting said central member.

24. A crankshaft milling machine, including in its construction a tailstock, a face plate rotatably mounted upon the tailstock and having parallel tracks extending across the face plate parallel to a diametric line, a plate confronting the face plate and operatively engaging said tracks, a screw extending on a diametric line and having threaded engagement with the last-named plate whereby the plate may be shifted toward or from the rotative center of the face plate, a cylindrical hollow chuck rotatably mounted upon the second-named plate for rotation around its own axis, the chuck having gear teeth, a worm mounted upon the second-named plate and engaging the gear teeth, the worm having means whereby it may be manually rotated to thereby rotatably adjust the chuck, and an indexing plate having a plurality of equally spaced apertures in its face and extending serially around the center of the plate, and means on the handle engageable with any one of said apertures.

25. In a mechanism of the character described, a bed, a carriage mounted upon the bed for movement longitudinally thereof, a ring mounted for rotation in a vertical plane within said carriage, the ring having a track extending parallel to but outward of a diametric line drawn through the center of the ring whereby the space defined by said ring and inward of the track is greater than a half circle, a crankshaft bearing mounted upon said track, manually operable means mounted upon the ring for adjustably shifting the bearing toward or from the center of the ring, and power operated means for rotating the ring.

26. A crankshaft milling machine, including two parallel beds, a rotatable milling cutter mounted on one of said beds for longitudinal movement therealong and for movement transversely of the bed toward and from the work, manually controlled power operated means for driving the cutter and feeding it toward the work or retracting it therefrom, tailstocks mounted on the other of said beds for adjustment toward or from each other, each tailstock having a radially adjustable and rotatably adjustable chuck for supporting the ends of the crankshaft, and power operated means disposed intermediate the tailstocks and adjustable along the last-named bed into a position adjacent to but on each side of the cutter and constructed and arranged for rotating the crankshaft and supporting it on each side of the plane of cut and closely adjacent thereto.

FRANK J. VAUGHN.